US010516467B2

(12) United States Patent
Hujanen et al.

(10) Patent No.: US 10,516,467 B2
(45) Date of Patent: Dec. 24, 2019

(54) DECOUPLING ANTENNA ELEMENTS

(71) Applicant: Teknologian tutkimuskeskus VTT Oy, Espoo (FI)

(72) Inventors: Arto Hujanen, Espoo (FI); Päivi Koivisto, Espoo (FI); Jouko Aurinsalo, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 15/101,937

(22) PCT Filed: Dec. 3, 2014

(86) PCT No.: PCT/FI2014/050950
§ 371 (c)(1),
(2) Date: Jun. 6, 2016

(87) PCT Pub. No.: WO2015/082771
PCT Pub. Date: Jun. 11, 2015

(65) Prior Publication Data
US 2016/0308599 A1     Oct. 20, 2016

(30) Foreign Application Priority Data

Dec. 4, 2013    (FI) ...................................... 20136219

(51) Int. Cl.
*H04B 7/08*    (2006.01)
*H04B 7/0413*    (2017.01)

(52) U.S. Cl.
CPC ........... *H04B 7/086* (2013.01); *H04B 7/0413* (2013.01)

(58) Field of Classification Search
CPC .............................. H04B 7/086; H04B 7/0413
See application file for complete search history.

(56) References Cited

U.S. PATENT DOCUMENTS 5,581,517 A * 12/1996 Gee ...................... G01S 7/52046
367/11
5,969,675 A * 10/1999 Erlick ...................... H01Q 3/24
342/373

(Continued)

FOREIGN PATENT DOCUMENTS

EP           2388931 A2      11/2011
WO        WO0171843 A2       9/2001
WO    WO2013022274 A2        2/2013

OTHER PUBLICATIONS

Hui H. T.: Decoupling methods for the mutual coupling effect in antenna arrays: a review. Recent Patents Engineering, 2007, vol. 1.

(Continued)

*Primary Examiner* — David B Lugo
(74) *Attorney, Agent, or Firm* — Seppo Laine Oy

(57) ABSTRACT

According to an example embodiment, there is provided an apparatus comprising circuitry configured to derive at least two outputs, wherein each output comprises a sum of at least two intermediate signals, the circuitry being configured to derive each intermediate signal by applying a coefficient to a signal received from an antenna element, each output corresponding to an antenna beam, and at least one processing core configured to select from a preconfigured plurality of coefficient sets a first set of coefficients, and to provide the selected first set of coefficients to the circuitry for use in deriving the intermediate signals, the selection being based at least in part on an operating condition relating to the apparatus. The coefficients may be chosen to decrease a correlation between the antenna elements, for example.

14 Claims, 5 Drawing Sheets

(56) References Cited

U.S. PATENT DOCUMENTS

| | | | |
|---|---|---|---|
| 6,031,877 A * | 2/2000 | Saunders | H01Q 3/2605 375/267 |
| 6,175,334 B1 | 1/2001 | Vannatta et al. | |
| 7,088,288 B1 * | 8/2006 | Margolese | H01Q 3/2605 342/377 |
| 8,929,494 B2 * | 1/2015 | Lee | G06K 7/10356 375/144 |
| 2007/0070927 A1 * | 3/2007 | Shoki | H04B 7/0417 370/310 |
| 2008/0002627 A1 | 1/2008 | Cha et al. | |
| 2010/0091745 A1 * | 4/2010 | Bevan | H04W 24/02 370/338 |
| 2011/0142154 A1 * | 6/2011 | Kyeong | H04B 7/0408 375/267 |
| 2011/0205118 A1 * | 8/2011 | Ojard | H01Q 25/00 342/373 |
| 2011/0291891 A1 * | 12/2011 | Nsenga | H04B 7/0617 342/373 |
| 2012/0020396 A1 | 1/2012 | Höhne et al. | |
| 2013/0002488 A1 * | 1/2013 | Wang | G01S 13/34 342/377 |
| 2013/0109333 A1 * | 5/2013 | Rowson | H04B 7/04 455/101 |
| 2014/0132478 A1 * | 5/2014 | Wang | H01Q 1/243 343/893 |
| 2014/0179240 A1 * | 6/2014 | Reinhardt | H01Q 1/523 455/73 |

OTHER PUBLICATIONS

Lau C. K. E. et al: Minimum norm mutual coupling compensation with applications in direction of arrival estimation. IEE Trans. on Antennas and Propagation, Aug. 2004, vol. 52.

Steyskal, H. et al: Mutual compensation in small array antennas. Dec. 1990 IEEE Trans. on Antennas and Propagation, vol. 38.

Vaughan R. G. et al: Antenna diversity in mobile communications. IEE Trans. on Vehicular Technology, Nov. 1987, vol. VT-36.

* cited by examiner

DECOUPLING ANTENNA ELEMENTS

FIELD OF INVENTION

The present invention relates to the field of wireless receivers comprising more than one antenna element.

BACKGROUND OF INVENTION

Wireless communication comprises that a transmitter, using an antenna, transmits information encoded in electromagnetic waves to a receiver, which detects the electromagnetic waves and is enabled to decode the information encoded in said waves. A radio path disposed between the transmitter and the receiver may affect the wireless communication. For example, where the receiver is in a line of sight of the transmitter, the electromagnetic waves may propagate directly from the transmitting antenna to the receiving antenna. In this case, the radio path may be a straight line from the transmitter to the receiver.

In cases where the receiver is not in a line of sight from the transmitter, the radio path may become more complex than a straight line. For example, the radio path may comprise reflections from buildings or natural features, such that the receiver may detect at least one reflected ray originating from the transmitter. A received signal strength may depend on whether strong reflected rays from the transmitter are incident on the receiving antenna. To increase the likelihood that strong rays are incident, the receiver may be furnished with more than one antenna, so that as long as at least one antenna detects a strong ray the transmitted information may be successfully decoded from the electromagnetic waves. Signals from each receiving antenna may be combined to harvest any detected rays.

In addition to multiple receiving antennas, also the transmitter may be furnished with more than one antenna. The effect of this is that the number of transmitted, and thus also reflected rays is increased as there are more than one transmitting antenna, thus also the likelihood that at least one of the rays is detected at the receiver is increased.

Multiple-input multiple-output, MIMO, transmission in general refers to multiple antennas at both the transmitter and the receiver. MIMO may enable, depending on implementation, at least one of beamforming, spatial multiplexing and diversity coding. Beamforming may comprise, for example, that a same signal is transmitter from more than one antenna with phase and amplitude weighting to improve reception at a receiver. Spatial multiplexing may comprise, for example, that a datastream is split into more than one lower-datarate signal, each lower-datarate signal being transmitted from a separate antenna. Diversity coding may comprise, for example, that the same datastream is transmitted from more than one antenna such that transmissions from different antennas are coded orthogonally to each other.

SUMMARY OF THE INVENTION

According to an aspect of the present invention, there is provided an apparatus comprising circuitry configured to derive at least two outputs, wherein each output comprises a sum of at least two intermediate signals, the circuitry being configured to derive each intermediate signal by applying a coefficient to a signal received from an antenna element, each output corresponding to an antenna beam, and at least one processing core configured to select from a preconfigured plurality of coefficient sets a first set of coefficients, and to provide the selected first set of coefficients to the circuitry for use in deriving the intermediate signals, the selection being based at least in part on an operating condition relating to the apparatus.

According to another aspect of the present invention, there is provided a method comprising deriving at least two outputs, wherein each output comprises a sum of at least two intermediate signals, and deriving each intermediate signal by applying a coefficient to a signal received from an antenna element, each output corresponding to an antenna beam, and selecting from a preconfigured plurality of coefficient sets a first set of coefficients, and providing the selected first set of coefficients for use in deriving the intermediate signals, the selection being based at least in part on an operating condition relating to an apparatus.

According to a yet further aspect of the present invention, there is provided an apparatus comprising means for deriving at least two outputs, wherein each output comprises a sum of at least two intermediate signals, and for deriving each intermediate signal by applying a coefficient to a signal received from an antenna element, each output corresponding to an antenna beam, and means for selecting from a preconfigured plurality of coefficient sets a first set of coefficients, and to providing the selected first set of coefficients for use in deriving the intermediate signals, the selection being based at least in part on an operating condition relating to the apparatus.

According to a yet further aspect of the present invention, there is provided a non-transitory computer readable medium having stored thereon a set of computer readable instructions for causing a device to at least derive at least two outputs, wherein each output comprises a sum of at least two intermediate signals, and to derive each intermediate signal by applying a coefficient to a signal received from an antenna element, each output corresponding to an antenna beam, and select from a preconfigured plurality of coefficient sets a first set of coefficients, and to provide the selected first set of coefficients for use in deriving the intermediate signals, the selection being based at least in part on an operating condition relating to an apparatus.

According to a yet further aspect of the present invention, there is provided a method, comprising repeatedly deriving a forecasted envelope correlation coefficient describing a correlation property of an antenna array, varying a set of coefficients, and selecting a first set of coefficients as an optimal set of coefficients, wherein the selection is based at least in part on a determination of minimal forecasted envelope correlation coefficient corresponding to the first set of coefficients.

DETAILED DESCRIPTION OF EXAMPLE EMBODIMENTS

In accordance with at least some embodiments of the present invention, sets of coefficients used in analog or digital front-end processing of a radio receiver may be dynamically selected in dependence of an operating condition of the receiver, such as for example a frequency band in use. Thus decoupling of antenna elements may be obtained in a way that is optimized for the operating condition. Embodiments of the invention also provide ways for pre-calculating sets of coefficients to use under different operating conditions.

Figure 1:
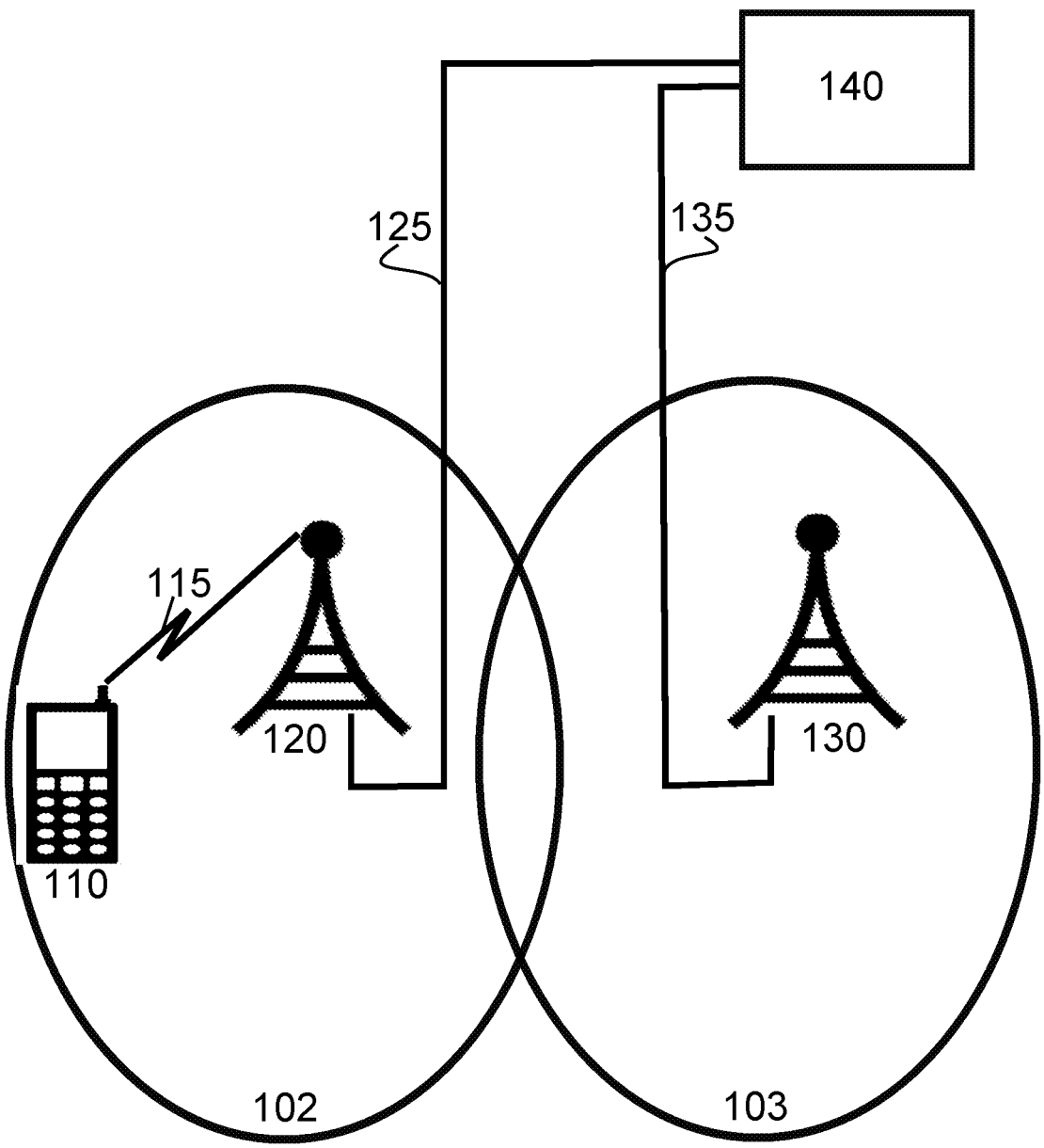
FIG. 1 illustrates an example system where at least some embodiments of the invention may be practiced.

FIG. 1 illustrates an example system where at least some embodiments of the invention may be practiced. Illustrated is mobile 110, which may comprise, for example, a cellular telephone, tablet device, laptop computer, phablet device or other electronic device with a wireless communication capability. Mobile 110 is illustrated as being in radio contact with base station 120 via wireless link 115. Wireless link 115 may operate in accordance with a cellular industry standard, for example, wherein mobile 110 and base station 120 may be configured to act in accordance with the same standard to ensure interoperability.

Wireless link 115 may proceed along a radio path that is line-of-sight or non-line-of-sight, or a combination of the two. Wireless link 115 may comprise an uplink for conveying information from mobile 110 to base station 120. Wireless link 115 may comprise a downlink for conveying information from base station 120 to mobile 110. Wireless link 115 may operate in accordance with time division multiple access, TDMA, frequency division multiple access, FDMA, code division multiple access, CDMA, technologies, or according to a combination of at least two such technologies, for example. Where mobile 110 and base station 120 are both furnished with at least two antennas that are used to communicate over wireless link 115, wireless link 115 may operate in accordance with MIMO.

While mobile 110 is in cell 102 controlled by base station 120, it may maintain a wireless link with base station 120. Should mobile 110 cross to a cell coverage area of cell 103, which is controlled by base station 130, a handover procedure may result in association of mobile 110 with base station 130. In this case, a wireless link would be caused to connect mobile 110 to base station 130 instead of base station 120. In some embodiments, mobile 110 may be enabled to maintain wireless links simultaneously with more than one base station, which may be known as soft handover or carrier aggregation, for example.

Base station 120 may be enabled to communicate, over connection 125, with a network node 140. Base station 130 may be enabled to communicate with the same or a different network node 140, using connection 135. Network node 140, which may comprise, for example, a mobility management entity, base station controller or other network node, may in turn be enabled to convey information to and from further network nodes, which are not illustrated in FIG. 1.

Where mobile 110 is furnished with more than one antenna, or antenna element, a radio receiver of mobile 110 may be enabled to receive electromagnetic energy from a transmitter of base station 120 over more than one radio path. To this end, reception is enhanced if the antenna elements are independent of each other. In case the antenna elements are not independent, they may exhibit a correlation, which means there are not genuinely several radio paths from the transmitter to the receiver, and consequently the enhancement of receiver performance from having more than one antenna element is reduced. Where the antennas exhibit a correlation, radio paths between them and the transmitter may experience similar fading characteristics. The reduction of enhancement may be the greater the greater is the correlation between the antennas, or antenna elements.

Improving the independence of the antenna elements, which corresponds to reducing correlation between the antenna elements, may thus improve receiver performance. This is so since when antennas are independent of each other, radio paths between them and the transmitter experience different fading characteristics, so that when one antenna is in a fade, another may be out of a fade and capable of reception.

Correlation between the antenna elements may be reduced by placing the antenna elements at a distance from each other. Increasing a distance between the antenna elements is more effective in implementations where space is available, for example in a base station receiver. Where mobile 110 comprises a cellular telephone, on the other hand, antenna elements comprised therein are constrained by the size of the cellular telephone and cannot be further from each other than a maximum dimension of the cellular telephone.

When antenna elements are so close to each other that they are not inherently completely independent of each other, their correlation may be controlled by decoupling signals they receive. Decoupling may comprise, for example, employing analog decoupling circuitry to process signal streams from the antenna elements so as to reduce their correlation characteristics. Analog decoupling circuitry may be configured to receive as input exactly one stream of input data in analog format from each antenna element, and to output a number of output streams that is equal to the number of input streams, the output streams having decreased correlation with each other with respect to the input streams. Decoupling circuitry may alternatively be digital processing circuitry, wherein the digital decoupling circuitry may be configured to receive input streams from antenna elements via analog-to-digital conversion. Digital decoupling circuitry may output a number of digital output streams equal to the number of digital input streams.

Figure 2:
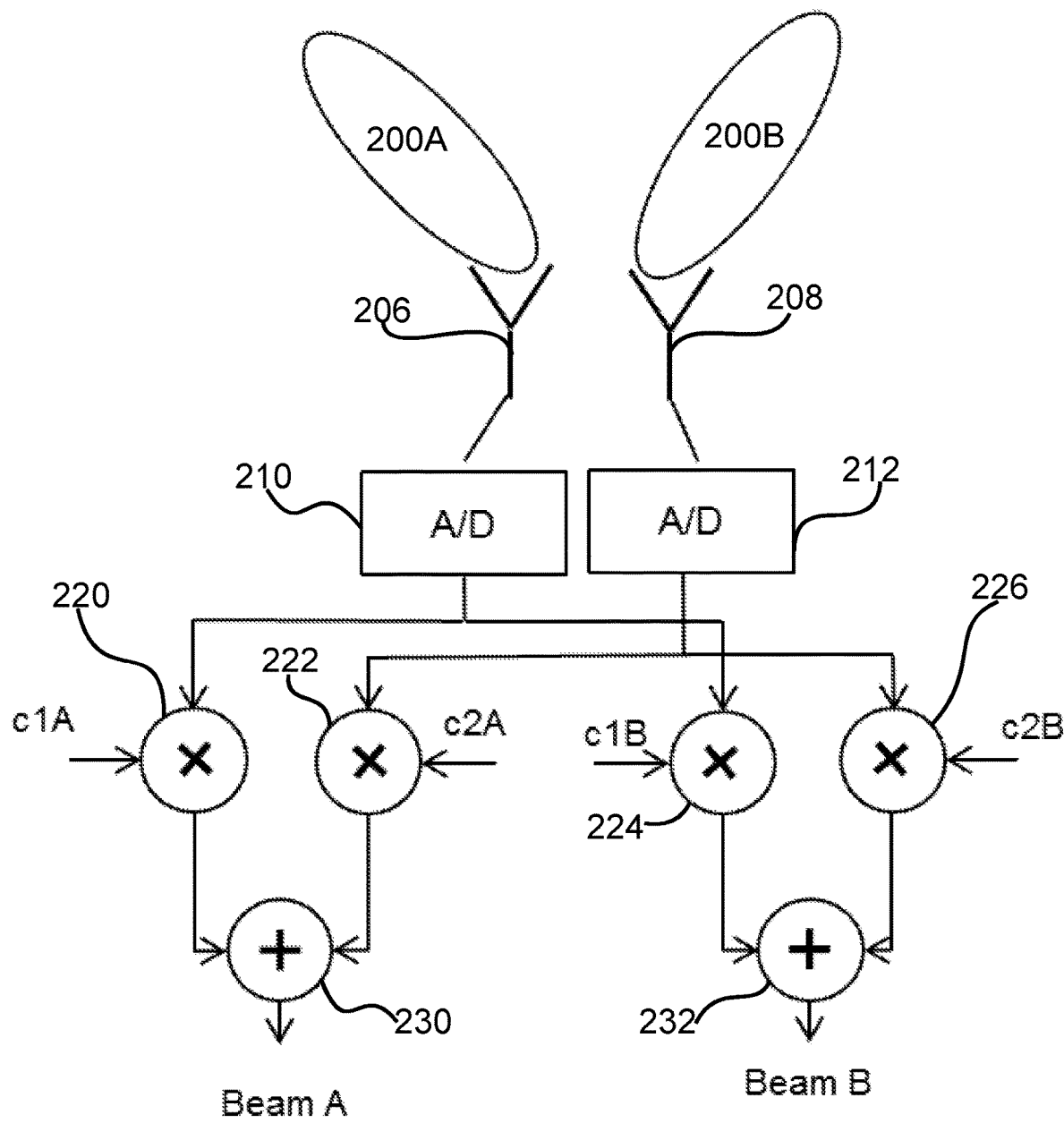
FIG. 2 illustrates a first architecture of an apparatus in accordance with some embodiments of the invention.

FIG. 2 illustrates a first architecture of an apparatus in accordance with some embodiments of the invention. In detail FIG. 2 illustrates a digital decoupling apparatus usable in multi-antenna receivers operating in accordance with at least some embodiments of the present invention. In FIG. 2, antenna elements 206 and 208 each receive electromagnetic waves and supply analog information thus harvested into analog-to-digital, A/D, converters, antenna element 206 to A/D converter 210 and antenna element 208 to A/D converter 212. A/D converter 210 and 212 each output digital streams to multiplication circuitries, in detail A/D converter 210 outputs identical copies of its output to multiplication circuitries 220 and 224 and A/D converter 212 outputs identical copies of its output to multiplication circuitries 222 and 226. The A/D converters may be configured to output complex-values samples as output, the complex-valued samples being presented in a suitable format. Each A/D converter may be arranged to output its data to a number of multiplication circuitries, the number of multiplication circuitries being the same as a number of antenna elements in the apparatus. Disposed in between antenna elements 206, 208 on the one hand and A/D converters 210, 212 on the other may be elements not illustrated in FIG. 2. Such non-illustrated elements may comprise at least one of a low-noise amplifier, LNA, a mixer and an amplifier, for example.

Multiplication circuitries 220, 222, 224, and 226 are configured to apply coefficients to the output streams of A/D converters 210 and 212. In detail, multiplication circuitry 220 multiplies each sample it processes by coefficient c1A, multiplication circuitry 222 multiplies each sample it processes by coefficient c2A, multiplication circuitry 224 multiplies each sample it processes by coefficient c1B and multiplication circuitry 226 multiplies each sample it processes by coefficient c2B. Where the coefficient used is a real number, it scales the amplitude of the processed sample. Where the coefficient is a complex number, it scales the amplitude of the processed sample, and rotates a phase of the sample. Each multiplication circuitry may be arranged to receive input from one and only one antenna element.

The multiplication circuitries may each output an intermediate signal, each intermediate signal comprising results of multiplications of coefficients and samples received in the multiplication circuitries from A/D converters. Summing circuitries 230 and 232 add samples from intermediate signals to yield outputs of the digital decoupling arrangement of FIG. 2. In detail, each summing unit may be configured to add a number of intermediate signals to each other, the number of intermediate signals added being the same as a number of antenna elements in the apparatus, such that no summing circuitry receives more than one intermediate signal from a same antenna element. In other words, each summing circuitry may be configured to receive exactly one intermediate signal originating from each antenna element.

The coefficients applied may be pre-calculated for an antenna assembly, the coefficients being designed to reduce correlation between antenna elements 206 and 208 when applied as described above. For example, for a known geometry of antenna elements, for example where the antenna elements are arranged immovably relative to each other, coefficients may be determined that may be employed to reduce correlation between antenna elements.

Coefficients that optimally decouple antenna elements may depend on an operating condition of an apparatus. For example, while it may be possible to derive a set of coefficients, in terms of FIG. 2, c1A, c2A, c1B and c2B, that yields a reduction in antenna element correlation, this set of coefficients may not be the set that yields a maximum reduction in correlation in all operating conditions. Rather, depending on at least one operating condition a set of better coefficients may be used.

Accordingly the apparatus of FIG. 2 may be configured to select a set of coefficients at least in part in dependence of an operating condition. For example, separate sets of coefficients may be pre-configured in the apparatus for different frequency bands. It may be possible that an optimal set for a 900 MHz frequency band differs from an optimal set for a 1800 MHz frequency band, for example. In this case, the apparatus may be configured to provide the optimal coefficient set for 900 MHz to the multiplication circuitries when the apparatus operates in a 900 MHz band. Likewise, the apparatus may be configured to provide the optimal coefficient set for 1800 MHz to the multiplication circuitries when the apparatus operates in a 1800 MHz band. Operating in this manner, the apparatus may obtain lower correlation between antenna elements 206, 208 for both frequency bands, compared to the situation where a single set of coefficients is used.

Likewise an optimal set of coefficients may depend on other operating conditions, such as an orientation of the apparatus, a direction of arrival of a radio signal and/or whether the apparatus is held next to a person's head or other environmental disturbance. The apparatus of FIG. 2 may be configured to adjust the coefficients provided to multiplication circuitries 220, 222, 224 and 226 depending on such operating conditions, or indeed their combinations. For example, the apparatus may be furnished with separate sets of coefficients for use when held next to a person's head and distant to a person's head when operating on a certain frequency band.

The apparatus of FIG. 2 may be configured to monitor operating conditions and responsive to a determination that at least one operating conditions changes, to adjust the coefficients provided to multiplication circuitries. In other words, the apparatus may be configured to monitor at least one operating condition and to dynamically adjust the coefficients in use to ensure the most suitable set of coefficients is in use as the at least one operating condition changes over time.

In matrix format digital decoupling of antenna elements may be presented as $$\begin{pmatrix} S_A \\ S_B \end{pmatrix} = \begin{pmatrix} c1A & c2A \\ c1B & c2B \end{pmatrix} \begin{pmatrix} s1 \\ s2 \end{pmatrix} = Cs$$

where c1A, c2A, c1B and c2B are the coefficients as described above, s1 a signal from a first antenna element and s2 a signal from a second antenna element. $S_A$ and $S_B$ are the decoupled beams.

Although described herein as a two-antenna element system, embodiments of the invention are equally applicable to receiver structures comprising more than two antenna elements. For example, where three antenna elements are present, the following may apply: the system comprises three summing circuitries each summing up three intermediate signals and the system comprises nine multiplication circuitries. The number of distinct A/D converters may or may not be the same as the number of antenna elements. In come embodiments, a single A/D converter may be capable of converting more than one analog signal to digital format. In these cases, the number of A/D converters may be smaller than the number of antenna elements. For example, where there are two antenna elements the number of A/D converters may be one or two.

Figure 3:
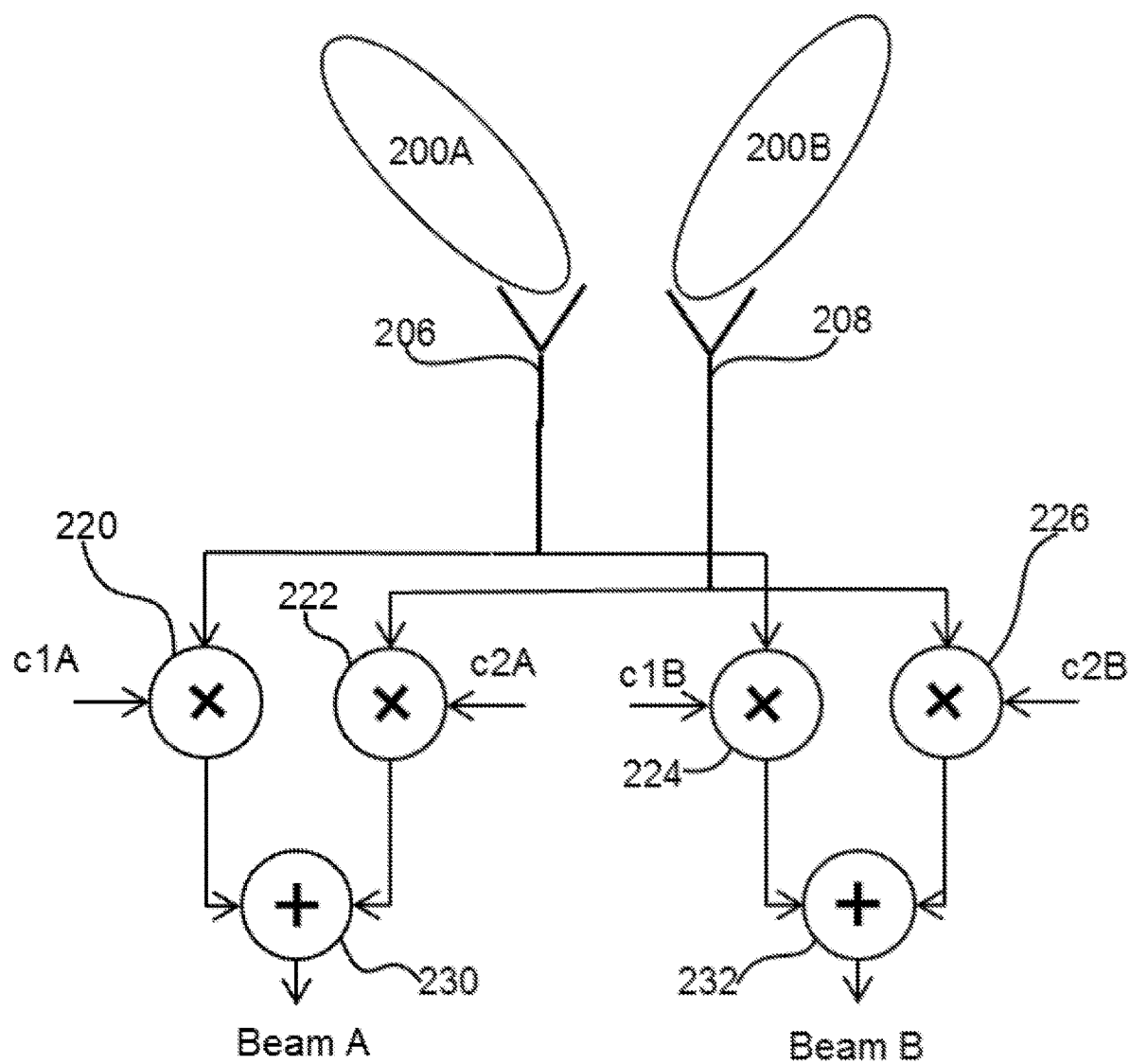
FIG. 3 illustrates a second architecture of an apparatus in accordance with some embodiments of the invention.

FIG. 3 illustrates a second architecture of an apparatus in accordance with some embodiments of the invention. Like reference numbers denote like elements when compared with FIG. 2. The principal difference between FIG. 2 and FIG. 3 is the absence of A/D converters in FIG. 3. In the embodiment illustrated in FIG. 3, an analog signal is provided from antenna elements 206 and 208 to multiplication circuitries 220, 222, 224 and 226 without converting it to digital format. In FIG. 3, the multiplication circuitries may be considered analog mixers which are configured to apply coefficients to analog signals to modify an amplitude and/or phase of the analog signals. The analog mixers output intermediate signals which, like those in FIG. 2, are summed in summing circuitries to yield decoupled output signals. Splitting analog antenna streams into two streams, for example, may incur a reduction of 3 dB in amplitude but this may be re-gained when the intermediate signals are later summed together. As in the embodiment of FIG. 2, here too the number of decoupled output signals can be the same as the number of antenna elements in the system. In a receiver system, the analog outputs may be provided from the summing circuitries to at least one A/D converter to convert the analog output signals to digital format for further processing in a receiver architecture. Alternatively, the analog outputs of the summing circuitries of FIG. 3 may be provided to components of an analog receiver that does not convert signals to digital format.

In the architecture of FIG. 3, the mixers and summing circuitries may be comprised in at least one analog component, such as for example at least one vector modulator.

The coefficients used in the architecture of FIG. 3 may be varied dynamically as discussed above in connection with FIG. 2.

Selecting the set of coefficients to use and controlling the provision of coefficients to multiplication circuitries or mixers may be effected by a control apparatus provided in connection with the architectures of FIG. 2 or FIG. 2. For example, a processor, controller, microcontroller, digital signal processor, DSP, field-programmable gate array, FPGA or application specific integrated circuit, ASIC, may be configured to collect information on an operating condition of the apparatus and to select a set of coefficients dynamically at least in part according to a determined operating condition. Sets of coefficients may be stored in a suitable memory that the control apparatus can access. The control apparatus may comprise an Intel Atom processor or an ARM Cortex-A9 processing core, for example.

The control apparatus may be enabled to collect information on at least one operating condition by receiving the information via electrical leads internally in an apparatus where the control apparatus and the architecture of FIG. 2 or FIG. 3 are comprised. For example the control apparatus may receive information concerning an operating frequency band of the apparatus, or the control apparatus may even decide which frequency band to use. Likewise, a control apparatus in a cellular phone may receive information on a physical orientation of the cellular phone, for example, from an orientation sensor comprised in the cellular phone. Apparatuses may also comprise, for example, an ear detector the output of which is usable in determining whether the apparatus is disposed next to a person's head, or more generally near an environmental disturbance. A channel estimator of a radio receiver, for example, may be enabled to determine, at least in part, a direction of arrival of at least one radio signal, and the control apparatus may be enabled to access this information in embodiments where the set of coefficients is at least in part selected based on a direction of arrival of at least one signal. Additionally or alternatively, an apparatus may be configured to employ, in turn, sets of coefficients optimized for different directions-of-arrival of radio signals, and to select a set that provides best performance.

The control apparatus may be configured to select the set of coefficients in two phases. For example, the control apparatus may be configured to initially select a set of coefficients based on a first operating condition and subsequently to select a set of coefficients, which may be relatively similar to the initially selected set, based on a second operating condition. For example, the control apparatus may be configured to first select a first set of coefficients to use based on a frequency band in use and subsequently to select a second set of coefficients based on which frequency within the frequency band is being used. A second selection of coefficients, deviating slightly from a first selection, may be performed to fine-tune beamforming of at least one antenna beam.

Since beamforming is done to improve sensitivity in a direction where a signal arrives from, the second selection may also be performed by using a direction of an arriving signal. The control apparatus may have access to a set of sets of coefficients and to information concerning which set is optimal for specific directions of arrival of signals. To this end, arrival directions may be quantified. For example, an arrival direction may be determined to fall within one of a plurality of predefined arrival direction bins. Arrival direction bins may comprise, for example, 4 to 12 preconfigured directions such that an actually determined arrival direction can be allocated to the closest preconfigured direction for the purpose of selecting a set of coefficients. Alternatively, the control apparatus may be furnished with information on how to fine-tune a set of coefficients selected in the first selection to improve reception from a direction a signal is determined to be arriving from.

A decoupling arrangement such as one described above and illustrated in FIG. 2 or FIG. 3 may be employed in a receiver of mobile 110 or base station 120, for example. The invention is not limited thereto, however, as similar receiver arrangements within the scope of the present invention may be used in a variety of different receivers, such as for example microwave link receivers. Receiver apparatuses configured to act in accordance with the present invention may be sold as components for use in constructing devices comprising receivers acting in accordance with the present invention. Computer programs may be provided, for example on non-transitory media, that are configured to cause selecting of the coefficients as described above. Such computer programs also embody the present invention. Such computer programs may cause the control apparatus, for example, to direct operation of a receiver in accordance with principles of the present invention.

Figure 4:
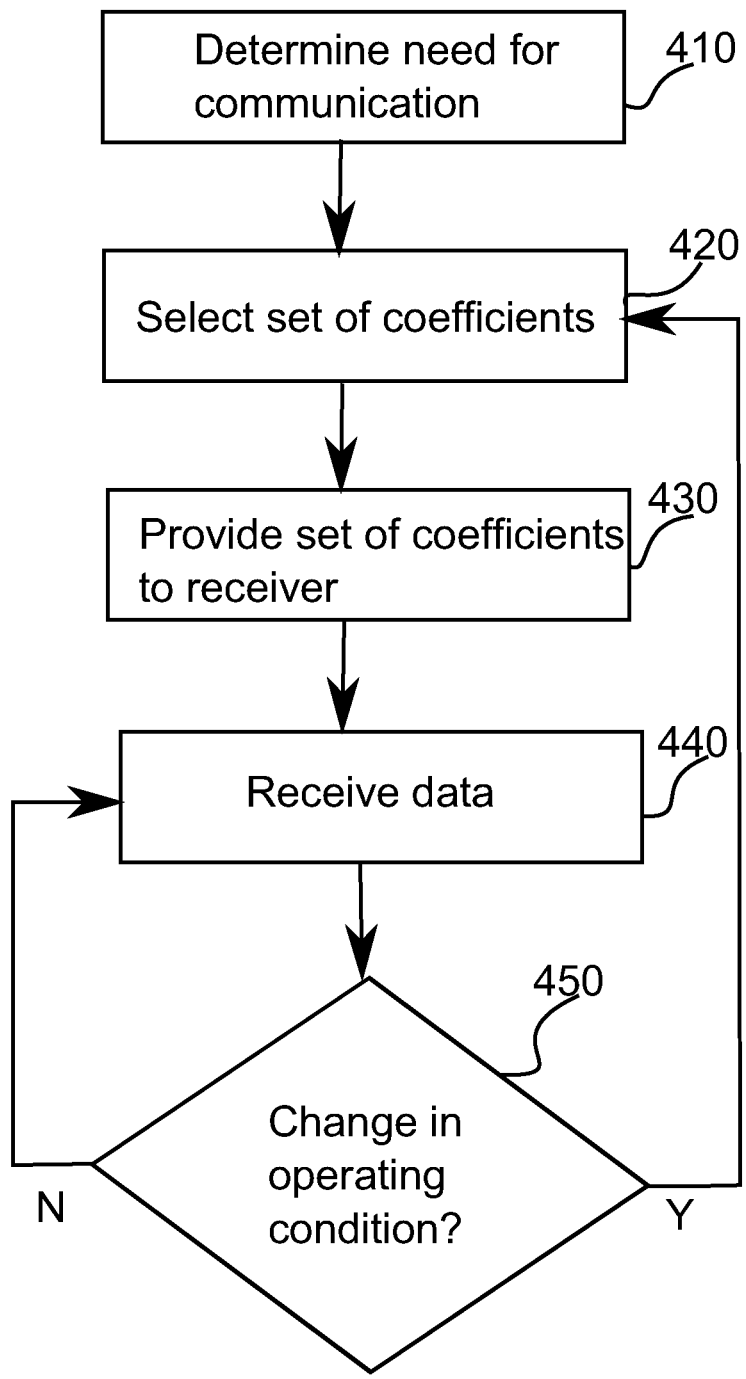
FIG. 4 is a flowchart of a first method in accordance with at least some embodiments of the invention.

FIG. 4 is a flowchart of a first method in accordance with at least some embodiments of the invention. Processing begins in phase 410, where it is determined that a need for communication exists. For example, an apparatus may be switched on or a user may interact with an apparatus to cause the apparatus to indicate a need for communication. Processing advances to phase 420, where a set of coefficients is selected. The set of coefficients may comprise, for example, a set of coefficients for decoupling antenna elements to reduce a correlation between at least two antenna elements. The set of coefficients may be selected from among a set of sets of coefficients furnished in the apparatus. The selection may be based at least in part on at least one operating condition of the apparatus, as described above in connection with FIGS. 1-3.

Phase 430 comprises providing the selected set of coefficients to a receiver. This may comprise providing the selected set of coefficients to multiplication circuitries of FIG. 2, or to analog mixers of FIG. 3. The providing may comprise, for example, providing exactly one coefficient from the selected set to each multiplication circuitry or analog mixer, respectively, so that every coefficient comprised in the selected set is caused to be provided to exactly one multiplication circuitry or analog mixer. Subsequent to phase 430, data is received in phase 440, wherein in phase 440 antenna elements are at least in part decoupled using the set of coefficients selected in phase 420 and provided to the receiver in phase 430.

In phase 450, which may occur concurrently with phase 440, it is determined if at least one operating condition of the apparatus has changed. In some embodiments, phase 450 is performed responsive to a predetermined interval of time having elapsed while in phase 440. In some embodiments, phase 450 is performed responsive to a determination that a data reception quality has changed while in phase 440. For example, it may be determined in phase 450 whether the at least one operating condition has changed, which was used when selecting the set of coefficients in phase 420. Alternatively, the determination of phase 450 may involve a different operating condition.

In case no change in operating condition is determined to have occurred, processing advances from phase 450 back to phase 440. In case a change in at least one operating condition is determined to have occurred since phase 420 was last performed, processing may advance from phase 450 back to phase 420 where a new set of coefficients is selected. The new selection may be based at least in part on at least one operating condition prevailing at the time the new selection is performed.

Figure 5:
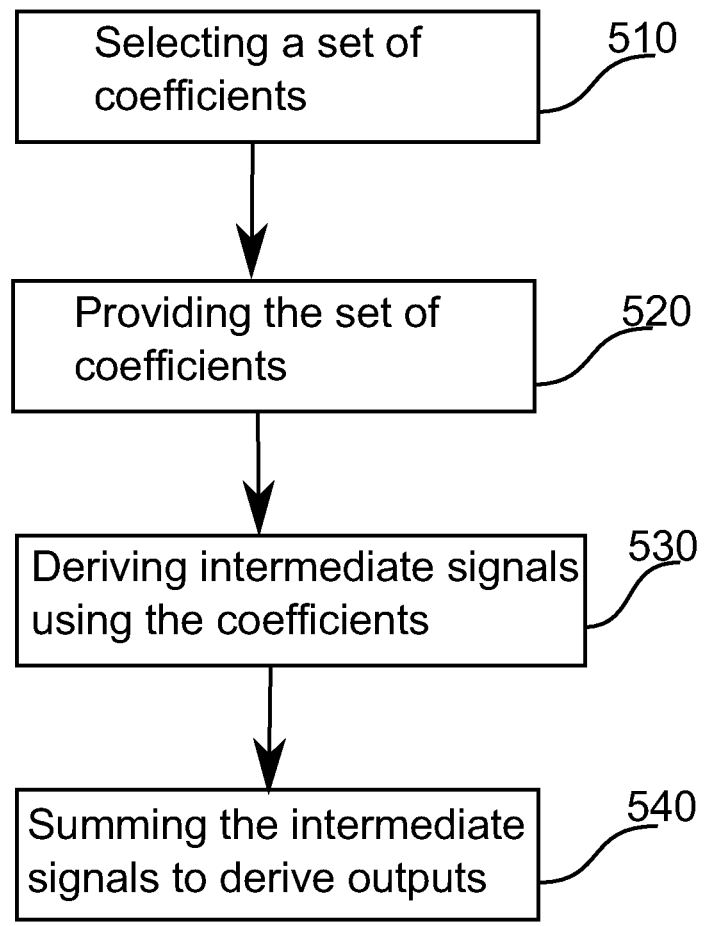
FIG. 5 is a flowchart of a second method in accordance with at least some embodiments of the invention.

FIG. 5 is a flowchart of a second method in accordance with at least some embodiments of the invention. The phases of the illustrated method may be performed in mobile 110 or base station 120, for example. Phase 510 comprises selecting a set of coefficients, wherein the selection is based at least in part on an operating condition relating to an apparatus. Phase 520 comprises providing the set of coefficients to a receiver, for example to multiplication circuitries or analog mixers as described above in connection with FIG. 4. Phase 530 comprises deriving intermediate signals using the coefficients, as described above in connection with FIG. 2 or FIG. 3. Finally phase 540 comprises summing the intermediate signals to derive outputs, as described above in connection with FIG. 2 or FIG. 3.

In general there is provided an apparatus, comprising circuitry configured to derive at least two outputs, wherein each output comprises a sum of at least two intermediate signals, the circuitry being configured to derive each intermediate signal by applying a coefficient to a signal received from an antenna element, each output corresponding to an antenna beam. The circuitry may comprise ASIC, FPGA, DSP, processor or controller circuitry, for example. The circuitry may comprise custom-designed integrated circuitry or programmable circuitry furnished with suitable programming. At least one of the intermediate signals and outputs may comprise complex-valued streams. The apparatus may further comprise at least one processing core configured to select from a preconfigured plurality of coefficient sets a first set of coefficients, and to provide the selected first set of coefficients to the circuitry for use in deriving the intermediate signals, the selection being based at least in part on an operating condition relating to the apparatus. The preconfigured plurality of coefficient sets may be stored in a memory the at least one processing core can access. The circuitry may comprise summing circuitry and multiplication circuitry. Deriving each output may comprise summing the at least two intermediate signals.

The circuitry may be configured to derive each intermediate signal by applying the coefficient to the signal received from one and only one antenna element. Applying the coefficient to the signal may comprise multiplying each complex-valued digital format sample comprised in the signal by a complex-valued coefficient. Complex multiplication may have the effect of changing amplitude and phase of each sample comprised in the signal.

The circuitry may comprise analog vector modulation circuitry configured to receive the signal from the antenna element in analog format. In this case, the circuitry may be configured to mix the analog signal with a coefficient to modify its amplitude and/or phase.

In some embodiments, the at least one processing core is configured to select the first set of coefficients to effect beamforming. In some embodiments, the at least one processing core is configured to select, subsequent to selecting the first set of coefficients, a second set of coefficients to fine-tune beamforming. The selection of the first set of coefficients may take place at least in part based on an operating condition of the apparatus not comprising direction of arrival of an incoming signal, and the selection of the second set of coefficients may be based at least in part based on a direction of arrival of an incoming signal.

Sets of coefficients may be determined using one or more coefficient determination methods. For example, an envelope correlation coefficient, ECC, or another correlation quantity, may be measured for an antenna arrangement in different operating conditions. By keeping the operating conditions fixed and varying coefficients used, a minimization technique may be employed to determine for each set of operating conditions a corresponding set of coefficients that in that set of operating conditions yields a minimal ECC. Additionally or alternatively to minimizing ECC, a set of coefficients may be determined for a set of operating conditions by seeking to maximize at least one of a channel capacity, branch balance and efficiency. Where more than one parameter is being optimized, by minimization or maximization, a compound metric may be determined where the more than one parameter is input with weights deemed suitable.

Alternatively to experimentally determining the sets of coefficients, numerical simulation or analytical coefficient determination methods may be used. For example, a method for deriving coefficients may comprise repeatedly deriving a forecasted envelope correlation coefficient describing a correlation property of an antenna array, varying a set of coefficients and selecting a first set of coefficients as an optimal set of coefficients, wherein the selection is based on a determination of minimal forecasted envelope correlation coefficient corresponding to the first set of coefficients. In other words, an ECC is forecasted for an antenna array and coefficients are varied to identify a minimum of the ECC. The set of coefficients that yield the minimum in ECC may be considered as optimal coefficients for the operating condition in question. The coefficients are in this case used as inputs when deriving the forecasted ECC. In some embodiments, some operating conditions are associated with optimal sets of coefficients using numerical or analytical methods, and other operating conditions are associated with optimal sets of coefficients using an experimental method. For example, presence of a head may be difficult to model analytically, so experimentation may be used to identify how the presence of a head near the antenna array affects the optimal coefficients.

In general, the radiation properties of the antenna element, and especially an antenna array comprising at least two antenna elements, are affected by feed voltages. In practice, these voltages may be controlled by antenna matching and phasing circuits. However, many electromagnetic, EM, simulators, like HFSS, do not support insertion of circuit parameters, but every circuit needs drawing and full EM simulation in order to get pattern data for envelope correlation calculation. In systematic envelope correlation studies this may lead to a cumbersome and time consuming procedure. On the other hand, a scattering matrix description may be used to create radiation pattern data with only one EM simulation round. The antenna may be described by the linear system $$\begin{pmatrix} w^{ant} \\ E^{sca} \end{pmatrix} = \begin{pmatrix} \Gamma^{ant} & r^{ant} \\ t^{ant} & s^{ant} \end{pmatrix} \begin{pmatrix} v^{ant} \\ E^{inc} \end{pmatrix}, \tag{1}$$

where the vectors $v^{ant}$ and $w^{ant}$, respectively, consist of the amplitudes of incident and scattered voltage waves at the local antenna ports; the vectors $E^{inc}$ and $E^{sca}$, respectively, consist of samples of incident and scattered, or radiated, field patterns on a sphere enclosing the entire antenna structure; the matrix $\Gamma^{ant}$ is the 'ordinary' scattering matrix of the antenna; the matrices $t^{ant}$ and $r^{ant}$, respectively, consist of the samples of the transmitting, or radiation, and receiving patterns of the antenna; and the matrix $s^{ant}$ describes the scattering of the incident field by the antenna when the local antenna ports are terminated by matched loads.

Each block of the matrix in equation (1) can be evaluated by using an electromagnetic, EM, simulator. For instance, $\Gamma^{ant}$ may be obtained as a result of an ordinary multiport simulation. Each column of $t^{ant}$ may be obtained through a post-process by evaluating the radiation pattern of the field radiated by the antenna in a case where one of the antenna ports is excited with a fixed incident voltage wave, and other ports are terminated by matched loads. Due to reciprocity, $r^{ant}$ may be essentially the same as the transpose of $t^{ant}$. Evaluation of $s^{ant}$ may require multiple simulations with plane wave excitations. However, when analysing a separate radio device, that is, an antenna structure in a space that is free from any other devices or objects in proximity, $s^{ant}$ may be unnecessary. Let the network be described by the linear system $$\begin{pmatrix} w_1^{net} \\ w_2^{net} \end{pmatrix} = \begin{pmatrix} \Gamma_{11}^{net} & \Gamma_{12}^{net} \\ \Gamma_{21}^{net} & \Gamma_{22}^{net} \end{pmatrix} \begin{pmatrix} v_1^{net} \\ v_2^{net} \end{pmatrix}, \quad (2)$$

where the vectors $v_1^{net}$ and $w_1^{net}$, respectively, consist of the amplitudes of incident and scattered voltage waves at ports of the network which are not to be connected to the antenna; vectors $v_2^{net}$ and $w_2^{net}$, respectively, consist of the amplitudes of incident and scattered voltage waves at ports of the network which are to be connected to the antenna; and matrices $\Gamma_{11}^{net}$, $\Gamma_{12}^{net}$, $\Gamma_{21}^{net}$ and $\Gamma_{22}^{net}$ represent different blocks of the total scattering matrix of the network.

A description for the combination of the antenna and the network is obtained from (1) and (2) by setting $v^{ant}=w_2^{net}$, $v_2^{net}=w^{ant}$:

$$\begin{pmatrix} w_1^{net} \\ E^{sca} \end{pmatrix} = \begin{pmatrix} \Gamma^{sys} & r^{sys} \\ t^{sys} & s^{sys} \end{pmatrix} \begin{pmatrix} v_1^{net} \\ E^{inc} \end{pmatrix}, \quad (3)$$

where matrices $\Gamma^{sys}$, $t^{sys}$, $r^{sys}$ and $s^{sys}$ are similar to the matrices in (1) but now including the effects of both the antenna and the network. Formulae for $\Gamma^{sys}$, $t^{sys}$, $r^{sys}$ and $s^{sys}$ are obtained by simple matrix algebra. Consider a case where the system is receiving a signal carried by an incident field $E^{inc}$. Let the ports be terminated by loads described by:

$$w^{load} = \Gamma^{load} v^{load}, \quad (4)$$

where $\Gamma^{load}$ is usually a diagonal matrix. $v^{load}$ and $w^{load}$ in terms of $E^{inc}$ are found from (3) and (4) by setting $v^{load}=w_1^{net}$, $v_1^{net}=w^{load}$. If needed, the total voltages U and the total currents I at any set of ports are obtained from $$U=z^{1/2}(v+w),$$

$$I=z^{-1/2}(v-w) \quad (5)$$

where z is a diagonal matrix consisting of the nominal impedances of the ports.

An approximate formula may be derived for the envelope correlation coefficient, denoted $\rho_e$. The approximation may be based on the assumption of very simple circumstances, involving the θ field component in the horizontal cut, θ=90°, with a unique receiving antenna pattern, a constant, $E_0=1$. The derivation may also require the following conditions to be fulfilled:

1) Real—$(x_n)$ and imaginary $(y_n)$ parts of the signal are zero-mean Gaussian random variables of equal variance, that is, the signal is Rayleigh distributed 2) $x_n$ and $y_n$ are independent:
$\langle x_1 y_1 \rangle = 0$, $\langle x_2 y_2 \rangle = 0$, $\langle x_1 y_2 \rangle = 0$, $\langle x_2 y_1 \rangle = 0$ and 3) the correlations ρ between the two real- and imaginary parts of the signal are equal and small:

$$\rho = \frac{\langle x_1 x_2 \rangle}{\sigma^2} = \frac{\langle y_1 y_2 \rangle}{\sigma^2} < 1$$

Finally, the formula is derived:

$$\rho_e \approx \left( \frac{\langle x_1 x_2 \rangle}{\langle x_1^2 \rangle} \right)^2 = |\rho|^2 \quad (6)$$

In a generalised form, this approximate expression for the envelope correlation coefficient can be expressed by the analytical formula $$\rho_e = \frac{\left| \int_\Omega (XPR \cdot E_{\theta 1} E_{\theta 2}^* P_\theta + E_{\phi 1} E_{\phi 2}^* P_\phi) d\Omega \right|^2}{\int_\Omega (XPR \cdot |E_{\theta 1}|^2 P_\theta + |E_{\phi 1}|^2 P_\phi) d\Omega \int_\Omega (XPR \cdot |E_{\theta 2}|^2 P_\theta + |E_{\phi 2}|^2 P_\phi) d\Omega} \quad (7)$$

Here, XPR stands for the cross-polarisation ratio, that is, the ratio of the power in the θ polarization to the power in the φ polarization of the incoming field. $P_\theta$ and $P_\phi$ are the θ and φ components of the angular density functions of the incoming plane wave, which should be normalised so that they satisfy the conditions $$\int_\Omega P_\theta d\Omega = \int_\Omega P_\phi d\Omega = 1 \quad (8)$$

Equation (7) shows clearly that $\rho_e$ can never be negative, in contrast to the usual definition of the correlation coefficient, which may receive values between −1 and 1. However, this difference is not critical, because for all practical purposes the envelope correlation coefficient turns out to be greater than zero. While using the analytical formula to calculate correlation, mutual coupling of the two antennas is taken into account by using the electric fields modified by the coupling in formula (7). In other words, the field may be obtained by feeding the port of the corresponding antenna while another antenna port is terminated by 50 Ohm load.

Following the common definition for the correlation coefficient, the envelope, or amplitude of voltage, correlation coefficient for two antennas can be expressed as:

$$\rho_e = \frac{\langle |V_1||V_2| \rangle - \langle |V_1| \rangle \langle |V_2| \rangle}{\sqrt{[\langle |V_1|^2 \rangle - \langle |V_1| \rangle^2][\langle |V_2|^2 \rangle - \langle |V_2| \rangle^2]}} \quad (9)$$

where ⟨ ⟩ stands for the expected value or time average. The signal received by the antenna n (the voltage induced at the antenna terminals) is $$V_n(t) = \sum_{l=1}^{L} h_n(\theta, \phi) \cdot E_l(\theta, \phi) = x_n + jy_n \quad n = 1, 2 \quad (10)$$

where $h_n$ is the vector effective height of the antenna n, which includes antenna radiation pattern. $E_l(\theta,\phi)$, $l=1 \ldots L$ represent the electric fields incoming from the direction $\theta$, $\phi$ arriving at time t to the antennas. Numerically, an incoming field is simulated by a complex number, the real and imaginary parts of which are normally distributed random numbers. In the case of a Rayleigh fading channel, their mean values are zero, corresponding to a non-line-of-sight multipath propagation. The line-of-sight portion due to the Rice fading channel is included in the signal by adding a real component to the sum of simultaneously incoming rays.

Because the correlation coefficient is here calculated stochastically, the finite number of successive source signals limits the accuracy of the calculation. Total number of signals may be 1000000. For example, two division into simultaneous (100 and 10) and successive signals (10000 and 100000) may be used. The choice of division may not make a significant difference on the calculated results.

The corresponding voltages with ports terminated in load impedances, may be obtained in two ways:

1) Loaded port case (LPC): the radiation patterns used while calculating the signal received by the antenna are the ones where the antenna ports are terminated by loads.

2) Open circuit case (OCC): open circuit radiation patterns are used in the vector effective height to obtain open circuit voltages ($V_1$, $V_2$) with the formula (10). Corresponding voltages ($V_{c1}$, $V_{c2}$) when the ports are terminated in load impedances ($Z_{L1}$, $Z_{L2}$) is given by $$V^C = \begin{pmatrix} V_{c1} \\ V_{c2} \end{pmatrix} = Z^C V = Z_L(Z + Z_L)^{-1} \begin{pmatrix} V_1 \\ V_2 \end{pmatrix} \quad (11)$$

where $$Z = \begin{pmatrix} Z_{11} & Z_{12} \\ Z_{21} & Z_{22} \end{pmatrix}$$

is the impedance matrix of the antenna system consisting of self- and mutual impedances and $$Z_L = \begin{pmatrix} Z_{L1} & 0 \\ 0 & Z_{L2} \end{pmatrix},$$

where $Z_{L1}$, and $Z_{L2}$ are the load impedances. Voltages $V_{c1}$, $V_{c2}$, are used in formula (9) to obtain the envelope correlation coefficient.

The complex correlation coefficient is also calculated stochastically by the correlation coefficient formula in the same way as the envelope correlation described in the previous section. Now the amplitude of voltage is replaced by the complex voltage:

$$\rho = \frac{\langle V_1 V_2^* \rangle - \langle V_1 \rangle \langle V_2^* \rangle}{\sqrt{[\langle V_1 V_1^* \rangle - \langle V_1 \rangle \langle V_1^* \rangle][\langle V_2 V_2^* \rangle - \langle V_2 \rangle \langle V_2^* \rangle]}} \quad (12)$$

The envelope correlation coefficient, ECC, is equal to the square of amplitude of the complex correlation coefficient as shown in equation (6), when the mentioned conditions are fulfilled.

If the correlation is defined by the equation (7) with XPR=1, $P_\Theta$=1 and $P_\Phi$=1, and if the antenna system is passive and lossless, the correlation can be calculated directly from the entries of the 'ordinary' scattering matrix of the antenna system as $$\rho_e = \frac{|\Gamma_{11}^* \Gamma_{12} + \Gamma_{21}^* \Gamma_{22}|^2}{(1 - |\Gamma_{11}|^2 - |\Gamma_{21}|^2)(1 - |\Gamma_{12}|^2 - |\Gamma_{22}|^2)} \quad (13)$$

The equation can also be obtained from the scattering matrix description of the form of (1) when there are two local ports. Namely, multiplying the first two columns of the matrix, first independently and then mutually, yields, due to the properties of a general passive and lossless scattering matrix, $$t_1^H t_1 = 1 - |\Gamma_{11}|^2 - |\Gamma_{21}|^2,$$

$$t_2^H t_2 = 1 - |\Gamma_{12}|^2 - |\Gamma_{22}|^2,$$

$$t_1^H t_2 = -\Gamma^*_{11} \Gamma_{12} - \Gamma^*_{21} \Gamma_{22}. \quad (14)$$

Now, these equations are essentially equal to the three integrals in (7) and, therefore, provide the equation (13). Equation (13) can be used to approximate the matching and isolation levels for achieving certain envelope correlation. The numerator of eq. (13) is chosen so that it gets its maximum value.

In general, the analytical equation (7) and complex correlation (12) formulas may yield the same result. Equation (13) provides the correct result only in a lossless case.

When using antenna scattering definition different radiation of receiving can be changed by using different weighting coefficients when combining antenna element signals.

By using different weighting coefficients one knows how antenna patterns or received signals or antenna impedances are changed. This information can be used for example for calculating envelope correlation, branch balance, port impedances, port couplings and/or radiation efficiency.

All this can be done beforehand under different operating conditions, which means that subsequently if the operating conditions are known the system can select an optimal set of weighting coefficients for those operating conditions.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A radio communication apparatus comprising an antenna array comprising at least two antenna elements, further comprising:
    circuitry configured to derive at least two outputs, wherein each output comprises a sum of at least two intermediate signals, the circuitry being configured to derive each intermediate signal by applying a coefficient to a signal received from an antenna element, each output corresponding to an antenna port, and
    at least one processing core configured to determine an operating condition relating to the apparatus, select, based solely on the operating condition, from a preconfigured plurality of coefficient sets a first set of coefficients designated as optimal for the operating condition, and to provide the selected first set of coefficients to the circuitry for use in deriving the intermediate signals to thereby reduce an envelope correlation coefficient of the antenna array, wherein the operating condition comprises at least one of: a frequency being used and a frequency band being used.

2. The radio communication apparatus according to claim 1, wherein the circuitry is configured to derive each intermediate signal by applying the coefficient to the signal received from one and only one antenna element.

3. The radio communication apparatus according to claim 1, wherein applying the coefficient changes at least one of an amplitude and phase of the signal.

4. The radio communication apparatus according to claim 1, wherein the circuitry is configured to receive each signal from each antenna element in digital format via at least one analog-to-digital converter, and wherein applying the coefficient comprises multiplying with a complex number comprising real and imaginary parts.

5. The radio communication apparatus according to claim 4, wherein the apparatus comprises the at least one analog-to-digital converter.

6. The radio communication apparatus according to claim 1, wherein the circuitry is configured to receive each signal from each antenna element in analog format, and wherein applying the coefficient comprises mixing the received analog signal with the coefficient.

7. The radio communication apparatus according to claim 1, wherein the at least one processing core is configured to perform the selection of the first set of coefficients responsive to a determination of a change in the operating condition.

8. A method in a radio communication apparatus comprising an antenna array comprising at least two antenna elements, comprising:
    deriving at least two outputs, wherein each output comprises a sum of at least two intermediate signals, and deriving each intermediate signal by applying a coefficient to a signal received from an antenna element, each output corresponding to an antenna port;
    determining an operating condition relating to the apparatus;
    selecting, based at least in part on the operating condition, from a preconfigured plurality of coefficient sets a first set of coefficients designated as optimal for the operating condition, and
    providing the selected first set of coefficients for use in deriving the intermediate signals, to thereby reduce an envelope correlation coefficient of the antenna array wherein the operating condition comprises at least one of: a frequency being used and a frequency band being used.

9. The method according to claim 8, wherein deriving each intermediate signal comprises applying the coefficient to the signal received from one and only one antenna element.

10. The method according to claim 8, wherein applying the coefficient changes at least one of an amplitude and phase of the signal.

11. The method according to claim 8, further comprising receiving each signal from each antenna element in digital format via at least one analog-to-digital converter, and wherein applying the coefficient comprises multiplying with a complex number comprising real and imaginary parts.

12. The method according to claim 8, further comprising receiving each signal from each antenna element in analog format, and wherein applying the coefficient comprises mixing the received analog signal with the coefficient.

13. The method according to claim 8, wherein the selection of the first set of coefficients is performed responsive to a determination of a change in the operating condition.

14. A non-transitory computer readable medium having stored thereon a set of computer readable instructions for causing a radio communication device comprising an antenna array comprising at least two antenna elements to at least:

derive at least two outputs, wherein each output comprises a sum of at least two intermediate signals, and to derive each intermediate signal by applying a coefficient to a signal received from an antenna element, each output corresponding to an antenna port;

determine an operating condition relating to the apparatus:

select, based at least in part on the operating condition, from a preconfigured plurality of coefficient sets a first set of coefficients designated as optimal for the operating condition, and provide the selected first set of coefficients for use in deriving the intermediate signals to thereby reduce an envelope correlation coefficient of the antenna array wherein the operating condition comprises at least one of: a frequency being used and a frequency band being used.

* * * * *